Aug. 25, 1959  L. W. ADAMS ET AL  2,901,403
UNDERGROUND STORAGE OF AMMONIA AND ITS RECOVERY
Filed Feb. 15, 1954
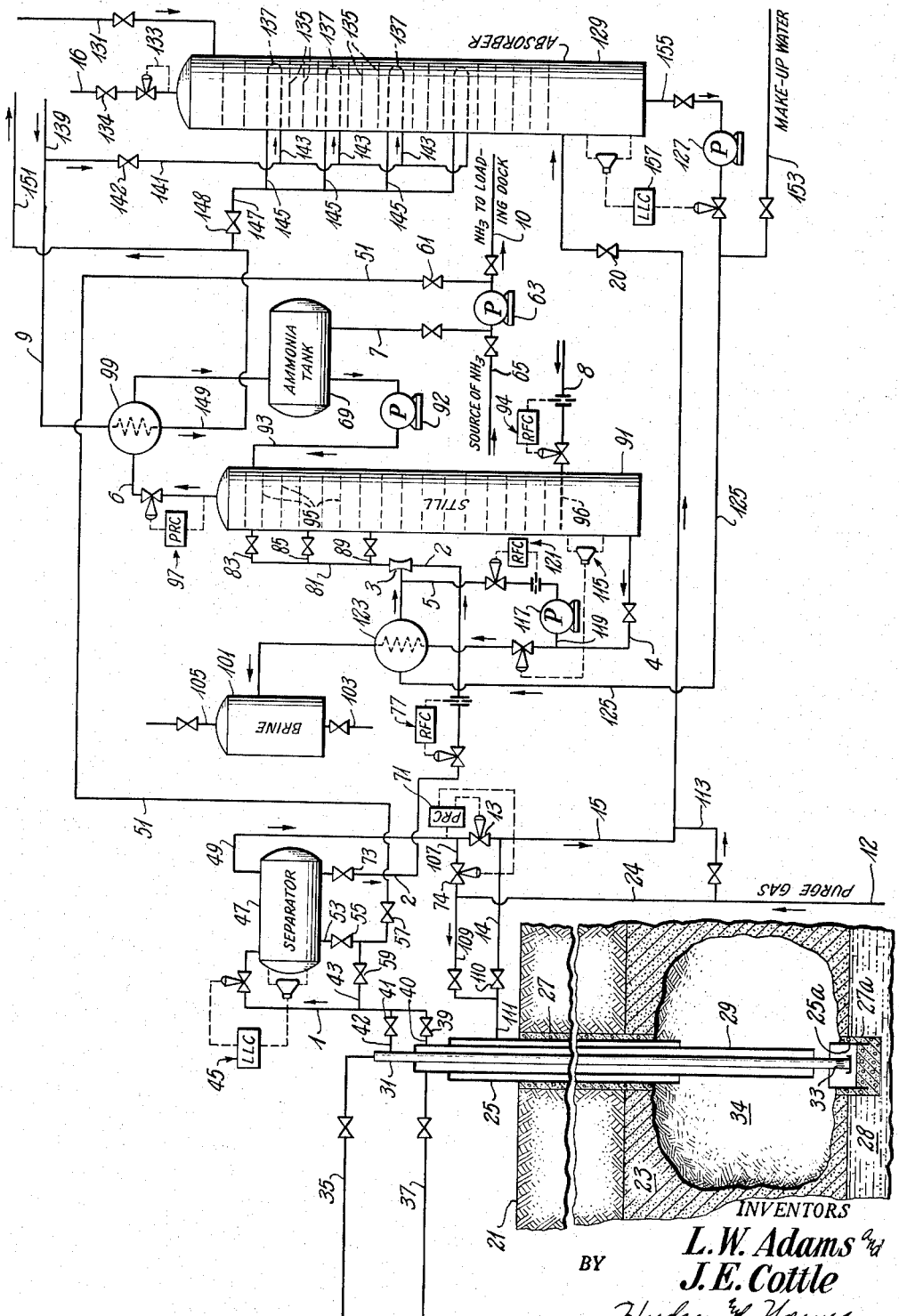
INVENTORS
L. W. Adams
J. E. Cottle
BY Hudson & Young
ATTORNEYS United States Patent Office 2,901,403
Patented Aug. 25, 1959

2,901,403
UNDERGROUND STORAGE OF AMMONIA AND ITS RECOVERY

Loyd W. Adams and John E. Cottle, Bartlesville, Okla., assignors to Phillips Petroleum Company, a corporation of Delaware Application February 15, 1954, Serial No. 410,290

10 Claims. (Cl. 202—39)

This invention relates to a method for storing liquid ammonia. In one aspect it relates to a method for storing liquid ammonia in an underground reservoir. In another aspect it relates to a method for forming a reservoir in a subterranean salt deposit, utilizing the reservoir so formed for the storage of liquid ammonia, recovering the ammonia from the reservoir and purifying the recovered ammonia to free it from salt dissolved from the walls of the reservoirs with the production of pure anhydrous ammonia.

In the production of such chemicals as liquid ammonia, which is now produced in large quantities, storage during seasons of slack use is a problem requiring serious consideration. Ammonia used by chemical manufacturing plants may be used at nearly constant rates throughout the year but ammonia which is intended to go, for example, into agricultural fertilizer may present a seasonal storage problem. Ammonia is used directly as a fertilizer by injecting the vapor into the soil, or into irrigation water, and when it is so used it usually is applied to the soil or added to the water shortly after delivery to the consumer. The use of free ammonia as a fertilizer is not yet in sufficiently wide use that storage facilities have been provided in agricultural areas, consequently ammonia is stored at or near its point of manufacture and upon shipment to the agricultural area it is used within a relatively short time.

An object of our invention is to provide storage facilities for liquid ammonia.

Another object of our invention is to provide storage for large quantities of liquid ammonia which requires only a minimum amount of steel.

Yet another object of our invention is to provide storage facilities for large volumes of liquid ammonia which are relatively simple and inexpensive to construct and to operate.

Still another object of our invention is to provide a method for the ultimate recovery of pure anhydrous ammonia after it has been stored in an underground salt cavern.

Yet other objects and advantages of our invention will be realized upon reading the following description and attached drawing which respectively describes and illustrates a preferred embodiment of our invention.

We accomplish these and other objects by drilling a borehole into a subterranean salt bed, dissolving out salt to produce a cavity or cavern of suitable size, storing liquid ammonia therein, then pressuring the ammonia from the cavern and distilling in the presence of water to produce anhydrous ammonia free from dissolved salt.

The figure represents in diagrammatic form a preferred embodiment of apparatus of our invention.

In areas in which oil, gas or deep water wells have been drilled subterranean structures are usually known. Having made certain that a subterranean salt deposit of sufficient thickness is present a well or bore hole is drilld down to and through the salt formation, as may be seen in the drawing. The well is drilled about 20 feet or so into a shale or rock bed 28 below the bottom of the salt bed. A casing is run into the hole and the lower end cemented up to 5 or 10 feet into the salt bed. The casing is cut off or disconnected at the top of this cemented section leaving the section of casing 25a firmly held in place by cement 27a. After this lower section of casing 25a has been disconnected, the upper casing is raised until its bottom end reaches a point a few feet below the top of the salt bed. At this point all of the remaining casing 25 is cemented into place by cement 27. A flow string 29 is then run in the casing to a point a short distance below the lower end of casing 25. A string of tubing 31 is then run in the flow string 29. The lower end of the tubing 31 has previously been capped and some slots 33 made in the tubing, for example, at spaced intervals around the circumference, just above the cap. Liquid is passed through the slots during construction of the reservoir and in its subsequent use for storage. This tubing 31 is run in the flow string 29 until the slots 33 reach a point a short distance above the top of the casing section 25a. To the top end of the casing 25 is connected a pipe 111 to one end of which is fastened a valve 110. To this valve is attached a pipe 14 which in turn is fastened to a pipe 15. Pipes 111, 14 and 15 are intended to conduct gases from casing 25 to an absorber vessel 129. To pipe 111 is attached a valved pipe 109 and to this latter pipe is attached a pipe 107 carrying a motor valve 74. This pipe 107 is also connected to a pipe 49. Pipes 49 and 15 are connected by a motor valve 13. The motor valves 13 and 74 are operated by a pressure recorder controller apparatus 71. This prssure controller apparatus 71 is intended to operate valves 13 and 74 in response to pressure in pipe 49. A pipe 24 is connected at one end to pipes 107 and 109 and at its other end to a pipe 12.

A valved pipe 37 is connected to the upper end of the flow string 29 for use in the preparation of the underground storage reservoir. A valved pipe 35 is connected to the upper end of tubing string 31 as shown.

The surface of the ground into which the well bore is drilled is identified by reference numeral 21.

To the upper end of the tubing string 31 is attached a pipe 42 provided with a valve 41. Pipe 42 is connected to a pipe 1 which leads to a separator tank 47. A float operated motor valve assembly 45 is provided in conjunction with pipe 1 and tank 47 as shown. A pipe 40 carrying a valve 39 is connected at one end to the upper end of the flow string 29 and at its other end to conduit 1. To the bottom of tank 47 is attached a pipe 53 carrying a valve 55. A pipe 43 carrying a valve 59 is connected at one end to conduit 1 and at the other end to pipe 53. A pipe 51 carrying a valve 57 is attached to pipes 43 and 53 as shown. The other end of pipe 51 is provided with a valve 61 at a point near the outlet of a pump 63. Conduit 10 is connected with the outlet of pump 63 and said pipe 51 is joined to this conduit 10.

Pipe 49 is connected with the top of tank 47 as shown. A pipe 2 carrying a valve 73 is connected at one end to the bottom of tank 47 and at its other end to an eductor apparatus 3. Pipe 2 is provided with a rate of flow controller apparatus 77. A manifold pipe 81 is connected at one end to the eductor 3 and at its other end to a vessel feed pipe 83. In addition to pipe 83, feed pipes 85, and 89 connect manifold pipe 81 to a still 91 at the several levels indicated. This still 91 is provided with liquid-vapor contacting apparatus 95, such as bubble cap trays or the like. A conduit 6 is connected at one end with the top of still 91 and at its other end to an ammonia receiving tank 69. Conduit 6 is provided with a back pressure regulator assembly 97 and with a condenser 99. A pipe 93, provided with a pump 92 leads from the bottom of tank 69 to the top of still 91. A conduit 7 also leads from the bottom of tank 69 to a pipe 65 which is connected at one end to the suction side of a pump 63 and its other end leads to a source of liquid ammonia, not shown. A conduit 4 leads from the bottom of still 91, by way of a heat exchanger 123, to a brine tank 101. A float controlled motor valve assembly 115 is shown for controlling the flow of liquid in conduit 4 in response to the level of liquid in the bottom of still 91. The brine tank 101 is provided with a vent pipe 105 and a bottoms draw off pipe 103. A pipe 119 connects pipe 4 with a pump 117. A conduit 5 leads from the outlet side of pump 117 to pipe 125 between the heat exchanger 123 and the eductor 3. A pipe 155 leads from the bottom of an absorber 129 to the inlet side of pump 127 from which pipe 125 leads on to heat exchanger 123 and thence to the eductor 3. A pipe 131 is attached to vessel 129 at a point near its top. A conduit 16 carrying a valve 134 and a back pressure regulator 133 is attached to the top of vessel 129. This vessel is provided with vapor-liquid contacting apparatus 135 such as bubble cap trays or the like. Vessel 129 is also provided with a plurality of heat exchangers 137 for cooling vapor and liquid materials undergoing contacting. A pipe 141 is connected at one end to a pipe 139 and is manifolded by pipes 143 to the heat exchangers 137. A conduit 9 is attached at one end to pipes 139 and 141 and at its other end to the condenser 99. Pipe 149 is connected to the condenser 99, as shown, and to a pipe 147 carrying a valve 148 and to a pipe 151. The pipe 147 is also manifolded by pipes 145 to the exchangers 137 in the absorber vessel 129. Pipe 141 carries a valve 142, as shown. A float controlled motor valve assembly 157 is provided for controlling the removal of liquid from the bottom of vessel 129 through pipes 155 and 125 in response to the levels of the liquid in the bottom of this vessel. A valve 20 is provided in conduit 15 at a point near the absorber vessel 129. A conduit 8 is provided with a rate of flow controller apparatus 94 for the control of the flow of steam to a steam distributing ring 96 in the kettle section of still 91.

In the formation of the subterranean storage reservoir a hole is drilled through the salt bed and about 20 feet into the shale or rock below the salt. The lower casing section is cemented to the bottom end of the drill hole, and the casing cut or disconnected leaving the casing section 25a cemented to the bottom end of the hole. The upper portion of the casing 25 is raised and cemented into place as herein before described. The flow string 29 is run into the casing and is lowered to a point some distance below the lower end of the casing section 25. The tubing string 31, the lower end of which is capped and contains slots 33, is run in the flow string and lowered to such a point that the slots 33 are positioned a short distance above the top end of the casing section 25a. Water from a source, not shown, is pumped through pipe 35 into the tubing string 31 under pressure. The water is sprayed through the slots 33 and dissolves the salt from the sides of the well bore. During this water injection operation an inert gas, such as an off gas containing $NH_3$, $H_2$, $N_2$, argon and helium, from a plant producing synthetic ammonia, by reaction of atmospheric $N_2$ with $H_2$ under high pressure in the presence of a reduced iron catalyst, is passed from a source, not shown, through conduit 12, pipes 24, 109, and 111 and through the annulus between the flow string 29 and the casing 25 into the reservoir being formed. When the water containing salt in solution rises in the reservoir to the level of the lower end of the flow string 29 which during the preparation of the reservoir is only a short distance below the lower end of casing 25, it begins to rise up the annulus between the flow string 29 and the tubing 31 being pressured by the gas. Sufficient gas is introduced, as mentioned, into the reservoir to maintain sufficient pressure that the brine will flow up the annulus and out through the valved pipe 37 for such disposal as desired. The inert gas introduced through the casing 25 serves an additional purpose of preventing the level of the water in the reservoir from reaching the open end of the casing. In actual operation sufficient gas is added that a gas cap is actually maintained in the top of the reservoir to prevent all of the salt from being dissolved from around the bottom end of casing 25 and exposing the bottom of the overlying strata of, for example, shale. It is desired to maintain a layer of the salt formation below the overlying strata of shale because in many instances when a shale is exposed to the action of water, disintegration and swelling occur, and shale from the roof of the reservoir would then be subject to caving. The addition of water through the tubing and slots 33 is continued until such time that it is believed that the reservoir of a desired size has been produced.

When the reservoir of desired size has been produced the introduction of water into the reservoir is terminated and the tubing 31 is lowered in the well to about a position illustrated in the drawing. The tubing 31 should be lowered at least some distance into the casing section 25a so that the slots 33 are located within this section of casing. Also the flow string 29 is lowered down the casing so that the lower end of the flow string 29 is disposed at a point above the top of the casing section 25a, as shown in the drawing. As additional quantity of the above mentioned inert gas is introduced into the reservoir through the casing 25 under such pressure that the brine enters tubing 31 by way of slots 33 and is forced up the tubing and through the valved pipe 35 for disposal. Of course during this final brine removal operation the valve in pipe 37 is closed so that the brine will not flow up the flow string 29. After removal of the brine from the reservoir the valve in pipe 35 is closed, the valve in pipe 37 is already closed and the valve in pipe 109 is closed to stop the flow of gas into the reservoir. The reservoir is now ready for the introduction liquid ammonia to be stored.

Liquid ammonia to be store and from a source, not shown, enters the system through the pipe 65 with the valve in pipe 10 being closed, and is pumped by pump 63 through the pipes 51, 43, and 40, valves 61, 57, 59 and 39 being open. The ammonia flows down the annulus in the flow string and is discharged therefrom at a point near the bottom of the reservoir. During the reservoir filling operation the valve 41 in pipe 42 and the valve in pipe 37 obviously are closed. Upon continued introduction of ammonia into the reservoir gas previously introduced through casing 25 is vented through pipe 111, valve 110, conduit 14 into conduit 15 through which the gas flows through the open valve 20 into the bottom of the absorber vessel 129. This vented gas is passed into this absorber vessel because the gas will contain ammonia vapors which are desired to be recovered. This filling operation is continued until such an amount of liquid ammonia as desired has been added and then valves 39, 59, 57 and 61 are closed. Likewise the valve in pipe 65 is closed.

When it is desired to remove liquid ammonia from the reservoir an inert gas, such as that produced in a plant producing synthetic ammonia, is introduced into the system through conduits 12 and 24, and through the valved pipe 109 and thence through pipe 111 into the casing 25. The liquid ammonia is forced into the tubing string 31 through the slots 33 and ammonia from the tubing 31 flows through pipe 42, valve 41 being open, and through conduit 1 into the separator tank 47. The inert gas is introduced into the reservoir under at least sufficient pressure to lift the ammonia into the separator tank 47 and to force the ammonia from this tank through an open valve 73 and the rate of flow controller apparatus 77 in pipe 2 and through the eductor 3, into the manifold 81 and through one or more of the inlet pipes 83, 85 and 89 into the still 91. The flow of liquid ammonia through conduit 1 into the separator tank 47 is controlled by the float controlled motor valve assembly 45 in response to the liquid level in this separator tank. The rate of flow controller apparatus 77 is intended to permit flow of liquid ammonia from the separator tank into the still at a desired rate. In starting up the apparatus, water from a source, not shown, is introduced into the system from a pipe 153, and flows on through pipe 125, heat exchanger 123 into the eductor 3 in which the ammonia from conduit 2 and the water are vigorously mixed. The mixture of water and ammonia is passed from the eductor through manifold pipe 81 into the still via one or more of the feed inlets 83, 85 or 89. Since a reduction of the pressure on the liquid ammonia occurs on passing through the eductor some of the ammonia vaporizes before it reaches the still and in this manner the feed material entering the still through inlet 83 contains a large proportion of ammonia vapor while that portion entering the still through inlet 85 contains less vapor and more liquid and that entering still through inlet 89 contains still less vapor and more liquid. Liquid entering the still through one or more of these said inlets flows in general down the column in countercurrent relation to upflowing ammonia vapors, and steam introduced into the still through the steam inlet apparatus 96. Steam from a source, not shown, enters the system through conduit 8 and flows through a rate of flow controller 94 into the steam distributor 96.

Upon continued operation of the still vaporous ammonia leaves the still through conduit 6 and back pressure regulator 97 and flows into the condenser 99. Cooling water from a source, not shown, enters the system through the pipe 139 and flows through conduit 9 and through the condenser 99 in indirect heat exchange relations with the ammonia. The water leaves the condenser 99 and flows through pipes 149 and 151 for such disposal as desired, for example, to a cooling tower. Condensate ammonia enters the ammonia storage tank 69 and such a portion as will be required to reflux the distilling operation is pumped through line 93 by pump 92 into the top of the still. This reflux ammonia is of course at a lower temperature than the top of the still and exerts a cooling effect thus condensing and washing downward water in such a manner that the ammonia leaving the top of the still through conduit 6 is anhydrous.

Mixing water with ammonia, for example, in eductor 3, previous to introduction of the ammonia into the still, prevents the precipitation of solid salt on the trays of the fractionator. The water flows downward in the still and reaches the bottom as a water solution containing substantial quantities of salt or as it might be termed is a very strong brine. If this brine reaching the bottom of the still is nearly saturated with respect to salt it is removed in its entirety from the still through conduit 4 and is discharged into the brine tank 101. In case relief of pressure from the brine tank is required relief may be obtained by opening the valve in pipe 105. The brine separated in tank 101 is removed therefrom through the valve pipe 103 for such disposal as desired.

In case the brine in the bottom of still 91 has a substantial capacity for salt a portion of the still bottoms is bypassed from conduit 4 through pipe 119 and this bypassed brine is pumped by pump 117 through the rate of flow controller 121 and through conduit 5 into pipe 125 through which this brine and makeup fresh water flow into the eductor 3 for introduction into the still with the said ammonia.

As mentioned hereinbefore ammonia carried in the gas phase from the gas cap over the ammonia in the reservoir can be recovered in the absorber 129. Water is introduced into this absorber from a source, not shown, through the valved pipe 131. On flowing down the absorber from tray to tray the water absorbs ammonia and in so doing becomes warm since the solution of ammonia in water is exothermic. In order to maintain the absorption medium in its flow down the absorber in a relatively cool and highly absorptive condition cooling water from line 139 is passed through pipe 141, valve 142 being open into the several heat exchangers via the several water inlets 143. Water leaves the several exchangers 137 through the water outlet pipes 145 and is passed through the manifold pipe 147, valve 148 being open, and through pipe 151 to such disposal as desired, for example, a cooling tower. Thus sufficient water is heat exchanged in the absorber that all or substantially all of the ammonia is recovered. Residue gas from this absorber flows through conduit 16, valve 134 being open, for such disposal as desired. The water solution of ammonia reaching the bottom of the absorber is removed from the absorber through pipe 155 and is pumped by pump 127 through line 125 for mixing with the liquid ammonia containing salt in solution in the eductor 3. This recirculated water containing ammonia in solution from the absorber will contain only a minor amount of salt. In case additional water is required in the system over that used in the absorber, it is introduced into the system from a source, not shown, through the valve pipe 153.

In Table 1 is given, for exemplary purposes, compositions of the materials flowing in conduits 1 to 10. This table also includes pressures and temperatures of the materials in said conduits.

Table 1

| Stream No. | 1 | 2 | 3 | 4 | 5 | 6 | 7 | 8 | 9 | 10 |
|---|---|---|---|---|---|---|---|---|---|---|
| $NH_3$, percent by wt. | 95 | 95 | 63 | 0.2 | 0.2 | 99.95 | 99.95 | 0 | 0 | 99.95 |
| $H_2O$, percent by wt. | 0 | 0 | 31.4 | 92.9 | 92.9 | .05 | .05 | 100 | 100 | .05 |
| NaCl, percent by wt. | 5 | 5 | 5.6 | 6.9 | 6.9 | 0 | 0 | 0 | 0 | 0 |
| Total lbs./hr. | 17,544 | 17,544 | 26,516 | 21,674 | 8,912 | 18,315 | 16,642 | 10,800 | 1,310,000 | |
| Total gal./min. | 556 | 556 | | 501 | 501 | 1 6,800 | 1 57 | 1 4,130 | 1 6,970 | 1 300 |
| Vapor, wt. percent | 0 | 0 | 26.2 | 0 | 0 | 100 | 0 | 100 | 0 | 0 |
| Cu. ft./min. | | | | | | | | | | |
| Pressure, p.s.i.g. | 300 | 300 | 230 | 235 | 235 | 230 | 230 | 265 | 380 | 380 |
| Temp., °F. | 70 | 70 | 163 | 399 | 399 | 105 | 105 | 406 | 100 | 100 |

¹ Cu. ft./min.

In Table 2 is given the composition of the streams 12 to 16 inclusive in terms of mol percent of ammonia, the cu. ft. per minute of such streams and temperatures and pressures since these streams are in the gas or vapor phase.

Table 2

| Stream No. | 12 | 13 | 14 | 15 | 16 |
|---|---|---|---|---|---|
| $NH_3$, mol. percent | 8 | 48 | 70 | 25 | 3 |
| Cu. ft./min. | 1,480 | 131 | 565 | 2,040 | 1,570 |
| P.s.i.g. | 1,000 | 270 | 200 | 50 | 0 |
| Temp., °F. | 70 | 75 | 80 | 70 | 90 |

The separator tank 47 serves as a run or surge tank between the reservoir and still and also as a separator tank for separating dissolved inert gases so that these gases will not be carried into the still and ultimately contaminate the final liquid ammonia product. Accordingly, the gases separated in the separator leave this tank through pipe 49 and flow through the pressure controlled motor valve 13 and through conduit 15 into the lower portion of the absorber 129. The gas flowing through conduit 15 from the separator 47 will flow at times when ammonia is being removed from the reservoir, and the gas entering the absorber by way of conduit 15 from the gas cap in the reservoir will be at times when the reservoir is being filled with liquid ammonia and the gas cap is being removed by displacement.

The aforementioned off gas from a plant producing synthetic ammonia by reaction of gaseous $N_2$ and $H_2$ in the presence of a reduced iron catalyst contains $NH_3$, $H_2$, $N_2$, Ar and He. The $N_2$ is obtained from air, and said air contains inert argon and helium, the residue gas, after recovery of at least a portion of the ammonia, contains these inerts. After recycling this residue gas to increase the yield of ammonia, a portion is bled from the process to prevent undue buildup of these inert gases.

While the above flow diagram has been described for illustrative purposes, the invention obviously is not limited thereto.

We claim:

1. A method for storing liquid ammonia and recovering same from the storage comprising introducing liquid ammonia into an underground storage space in a subterranean salt formation, introducing a synthetic ammonia plant off gas into said storage space under pressure, withdrawing a liquid comprising liquid ammonia from said storage space by displacement with said gas, introducing the withdrawn liquid comprising liquid ammonia into a fractionating still, introducing water into said still, adding reboiling heat to the kettle section of said still, removing vapors from the top of said still, condensing said vapors, dividing the condensate into two portions, returning one portion to the upper portion of said still as reflux, removing the other portion as the main product of the process and removing a salt brine from the kettle of said still.

2. A method for operating an underground storage reservoir for the temporary storage of liquid ammonia comprising introducing liquid ammonia into said reservoir, pressuring a synthetic ammonia plant off gas into said reservoir and withdrawing liquid comprising ammonia by displacement with said gas, adding water to the withdrawn liquid, fractionally distilling the ammonia-water mixture, recovering distillate ammonia as the main product of the process and recovering an aqueous salt solution.

3. A method for operating an underground storage reservoir for the temporary storage of liquid ammonia comprising introducing liquid ammonia into said reservoir, pressuring a synthetic ammonia plant off gas comprising hydrogen, nitrogen, argon, helium and vaporous ammonia into said reservoir and withdrawing liquid comprising ammonia by displacement with said gas, adding water to the withdrawn liquid, fractionally distilling the ammonia-water mixture, recovering distillate ammonia as the primary product of the process and recovering an aqueous salt solution.

4. The method of claim 3 wherein said gas is obtained from an operation involving reaction over a catalyst of a gaseous mixture comprising hydrogen and nitrogen.

5. A method for operating an underground storage reservoir in a salt bed for the temporary storage of liquid ammonia comprising pressuring a synthetic ammonia plant off gas comprising hydrogen, nitrogen, argon and vaporous ammonia into said reservoir to displace air therefrom, introducing liquid ammonia into said reservoir and displacing said gas, pressuring a quantity of said gas, into said reservoir and withdrawing liquid comprising ammonia and salt in solution by displacement with said gas adding water to the withdrawn liquid, fractionally distilling the ammonia-water mixture, recovering distillate ammonia as the primary product of the process and recovering an aqueous salt solution.

6. A method for operating an underground storage reservoir in a salt bed for the temporary storage of liquid ammonia comprising pressuring a synthetic ammonia plant off gas comprising hydrogen, nitrogen, argon, helium and vaporous ammonia into said reservoir to displace air therefrom, introducing liquid ammonia into said reservoir and displacing said gas, pressuring a further quantity of said gas into said reservoir and withdrawing liquid comprising ammonia and salt in solution by displacement with said gas, adding water to the withdrawn liquid, fractionally distilling the ammonia-water mixture, recovering distillate ammonia as the primary product of the process, recovering an aqueous salt solution, contacting the displaced gas and water in an absorption operation and therefrom removing the gas free of ammonia as an additional product of the process and admixing water containing ammonia in solution from the absorption operation with the withdrawn liquid ammonia as the added water.

7. A method for operating an underground storage reservoir in a salt bed for the temporary storage of liquid ammonia, comprising pressuring a synthetic ammonia plant off gas comprising hydrogen, nitrogen, argon, helium and vaporous ammonia into said reservoir to displace air therefrom, introducing liquid ammonia into said reservoir and displacing a portion of said gas, pressuring a further quantity of said gas into said reservoir and withdrawing liquid comprising ammonia, dissolved gas and salt by displacement with said gas, reducing the pressure on the withdrawn liquid in a flashing operation and removing flashed gas therefrom, adding water to the liquid ammonia remaining from the flashing operation and distilling the mixture, recovering distillate ammonia as a primary product of the process and removing an aqueous salt solution, contacting said gas displaced from the reservoir with water in an absorption operation, also contacting said gas from said flashing operation with water in an absorption operation, from these absorption operations removing unabsorbed gas as an additional product of the process and admixing the water containing dissolved ammonia from the latter absorption operation with the liquid ammonia from the flashing operation and distilling the admixture in the aforementioned distilling operation.

8. In the method of claim 7 dividing said aqueous salt solution from the fractionating operation into two portions, withdrawing one portion from the process and adding the other portion to the ammonia and water solution from the absorption operation prior to the distillation operation.

9. A method for storing liquid ammonia in a reservoir in a subterranean salt bed comprising drilling a well bore into said salt bed, spraying water into said salt bed to dissolve salt, removing brine from said salt bed thereby producing an underground reservoir in said salt bed, pressuring a synthetic ammonia plant off gas comprising hydrogen, nitrogen, argon, helium and vaporous ammonia into said reservoir to displace air therefrom, introducing liquid ammonia into said reservoir for storage into said reservoir and displacing at least a portion of said gas, pressuring a further quantity of said gas into said reservoir and withdrawing liquid comprising ammonia and salt in solution by displacement with said gas, adding water to the withdrawn liquid, fractionally distilling an ammonia water mixture, recovering distillate ammonia as a primary product of the process and recovering an aqueous solution.

10. In the process of claim 9 introducing said gas into the reservoir during its formation by water spraying.

References Cited in the file of this patent
UNITED STATES PATENTS

| | | |
|---|---|---|
| 327,308 | Peters | Sept. 29, 1885 |
| 586,950 | Frerichs | July 20, 1897 |
| 1,324,979 | Piron | Dec. 16, 1919 |
| 1,923,896 | Trump | Aug. 22, 1933 |

(Other references on following page)

UNITED STATES PATENTS

| | | |
|---|---|---|
| 2,012,621 | Bennett | Aug. 27, 1935 |
| 2,221,518 | Jennings | Nov. 12, 1940 |
| 2,400,986 | Voorhees | May 28, 1946 |
| 2,444,175 | Teter et al. | June 29, 1948 |
| 2,519,451 | Fulton | Aug. 22, 1950 |
| 2,590,066 | Pattinson | Mar. 18, 1952 |
| 2,659,209 | Phelps | Nov. 17, 1953 |
| 2,677,666 | Dougherty | May 4, 1954 |
| 2,713,775 | Cottle | July 26, 1955 |
| 2,732,334 | Pollock | Jan. 24, 1956 |

OTHER REFERENCES

"Chemical Engineering Operations," F. Rumford, Constable & Co., Ltd. (London, 1951), pp. 8–11.

"Types of Underground Liquid Storage," by Ball. The Petroleum Engineer, 1954, Reference Annual, pp. E–21, 22 and 24.

"Propane Transportation and Storage . . . .," Boyd et al., The Petroleum Engineer, 1954, Reference Annual, pp. D–26, 28, 29 and 30.

UNITED STATES PATENT OFFICE
CERTIFICATE OF CORRECTION

Patent No. 2,901,403                                        August 25, 1959

Loyd W. Adams et al

It is hereby certified that error appears in the printed specification of the above numbered patent requiring correction and that the said Letters Patent should read as corrected below.

Column 7, line 23, for "the storage" read -- an underground storage space --; line 69, strike out the comma after "gas" and insert the same after "gas" in line 71, same column 7.

Signed and sealed this 19th day of April 1960.

(SEAL)
Attest:

KARL H. AXLINE
Attesting Officer

ROBERT C. WATSON
Commissioner of Patents